July 25, 1967  G. J. SPILLMAN  3,332,528
ARTICLE HANDLING MECHANISM
Filed March 18, 1966

INVENTOR
GERARD J. SPILLMAN
BY Wolmar Stoffel
ATTORNEY

United States Patent Office 3,332,528
Patented July 25, 1967

3,332,528
ARTICLE HANDLING MECHANISM
Gerard J. Spillman, Poughkeepsie, N.Y., assignor to International Business Machines Corporation, Armonk, N.Y., a corporation of New York
Filed Mar. 18, 1966, Ser. No. 535,600
6 Claims. (Cl. 198—24)

ABSTRACT OF THE DISCLOSURE

The handling mechanism transfers a workpiece from a movable carrier to a chute or like support. The carrier has a number of units, each consisting of a pair of workpiece clamping arms and a workpiece support pedestal. A chute is located adjacent and above the carrier at a height approximately the height of the upraised pedestal. A conveyor is located above the chute to sweep workpieces off the pedestal.

---

This invention relates to article handling, more particularly to a mechanism for removing articles from the moving carrier, still more particularly to a mechanism for removing workpieces from an indexing rotatable carrier at relatively high removal rates without disturbing or damaging the workpieces.

The article handling mechanism is particularly useful to the electronic component manufacturing industry for use in screen printing apparatus that imprint small electrical circuits, resistors, and the like on substrates. Such a printing apparatus is described in commonly assigned U.S. patent application S.N. 535,384, entitled, "Printing Apparatus," filed Mar. 18, 1966.

Automation in manufacturing has resulted in the development of machines that are capable of performing very exacting manufacturing operations at relatively high volume rates. Ordinarily a single machine will perform a single operation. The workpieces at various stages of their manufacture must be transferred from machine to machine. Handling of the workpieces becomes a prime consideration, particularly if the workpieces are fragile, sensitive to shock or vibration, or contain uncured materials or the like. When a processing machine is operated at high volume rates, the workpieces must be removed from the machine at the same high rate.

Known apparatus for article handling, particularly for removing a relatively fragile workpiece having uncured materials embodied therein from a manufacturing machine on which the workpieces are processed on a rotatable carrier, fail to perform satisfactorily. Such a manufacturing machine is the "Printing Apparatus" referred to previously. Known article removal mechanisms are incapable of dependably and gently removing the substrates during the dwelt time of the carrier. Further, jiggling and bumping of the substrates must be held to a minimum in order to avoid damage to the uncured resistor or circuit patterns placed on the substrates by the machine. Bumping and jiggling of the substrates is ordinarily difficult to avoid when the machine is operated at high volume rates. Further, the circuit patterns or resistors printed on the substrates must not be contacted since the coatings are normally uncured and subject to damage.

An object of this invention is to provide new article handling mechanisms.

Another object of this invention is to provide a new workpiece removal mechanism that will in operation remove workpieces from a movable carrier at high volume rates.

Yet another object of this invention is to provide a new workpiece removal mechanism for removing workpieces from a movable carrier that is dependable in operation.

Another object of this invention is to provide a new workpiece handling mechanism for removing workpieces from a movable carrier that is capable of dependably and gently removing fragile workpieces at high volume rates without causing damage to the workpieces.

Yet another object of this invention is to provide a new article handling mechanism wherein workpieces are removed from an indexing rotating carrier during the dwell time of the carrier that embodies a safety mechanism for halting operation in the event of a malfunction or stoppage.

Another object of this invention is to provide an article handling mechanism capable of handling small relatively fragile workpieces having uncured materials embodied thereon.

The present invention provides an article handling mechanism for removing at an unload station workpieces from a movable carrier. The handling mechanism has at least one workpiece holder on the movable carrier and a chute having a terminal end positioned adjacent the workpiece holder when the holder is located at the unload station. A conveyor is positioned over the chute in close spaced relation with a portion thereof extending over the workpiece holder when the holder is located at the unload station. The conveyor is provided with a plurality of cogs which in use are adapted to sweep a workpiece from the holder to the chute.

In operation the article handling mechanism of the invention gently and efficiently sweeps workpieces from the workpiece holder onto a chute where they are then transferred to a suitable adjacent conveyor or to other manufacturing apparatus for further operations. The sweeping mode of operation of the article handling mechanism handles the workpieces gently but firmly without imparting a significant force thereto or contacting the top surface and printed pattern thereon. The relatively short dwell time of the rotatable carrier is utilized to the fullest extent since the conveyor provides a cog to move the workpiece from the workpiece holder the instant it arrives in position. Further, the top surface of the workpiece is not contacted or disturbed, which is an important consideration in a printing apparatus or similar apparatus wherein the top surface of the module is particularly prone to damage. Further, since the workpiece need not be gripped the time interval of the sweeping operation can be extended over the entire length of the dwell time thereby enabling the movement thereof to be accomplished at a relatively slower rate.

The foregoing and other objects, features and advantages of the invention will be apparent from the following more particular description of a preferred embodiment of the invention as illustrated in the accompanying drawings.

Figure 2:
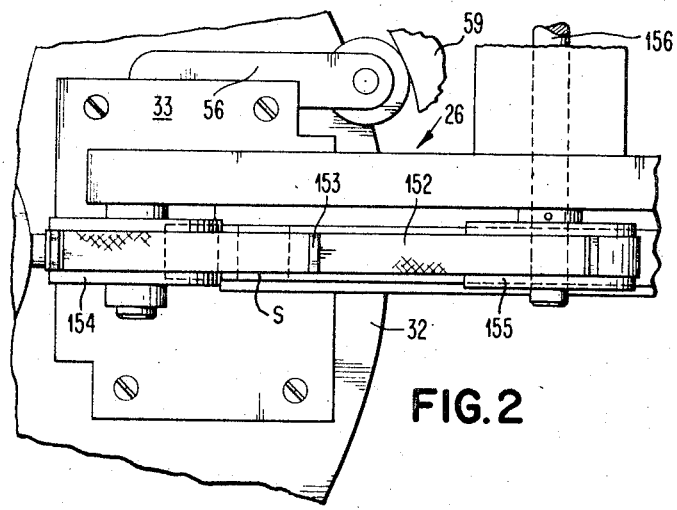
FIG. 2 is a top plan view with parts broken away of the apparatus illustrated in FIG. 1.

Referring now to the drawing there is illustrated a preferred specific embodiment of the unloader mechanism 26 of my invention particularly adapted for removing small substrates S from a revolving carrier 32. Carrier 32 has mounted thereon a plurality of work holders 33, each adapted to position and hold a substrate. Work holders 33 are each provided with a pair of clamping arms 50 for contacting the edges of substrates S, and a pedstal 40 for supporting the substrates. The clamping arms are actuated by cam follower arm 56. Pedestal 40 is moved by a cam actuator mounted on the lower end portion 46 of pedestal 40. An indexing drive is provided to rotate carrier 32.

Figure 3:
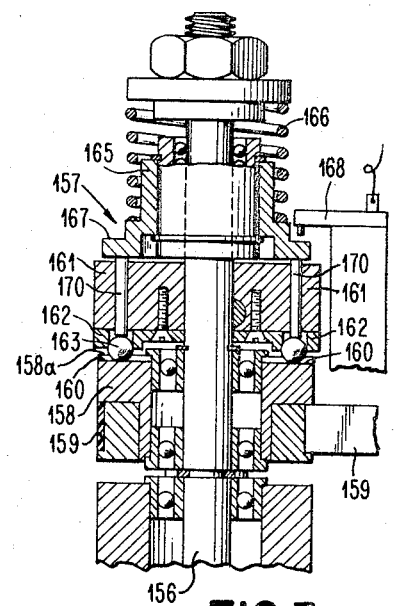
FIG. 3 is a detail view in cross section showing the specific structure of the conveyor clutch of the unloading mechanism.
Figure 1:
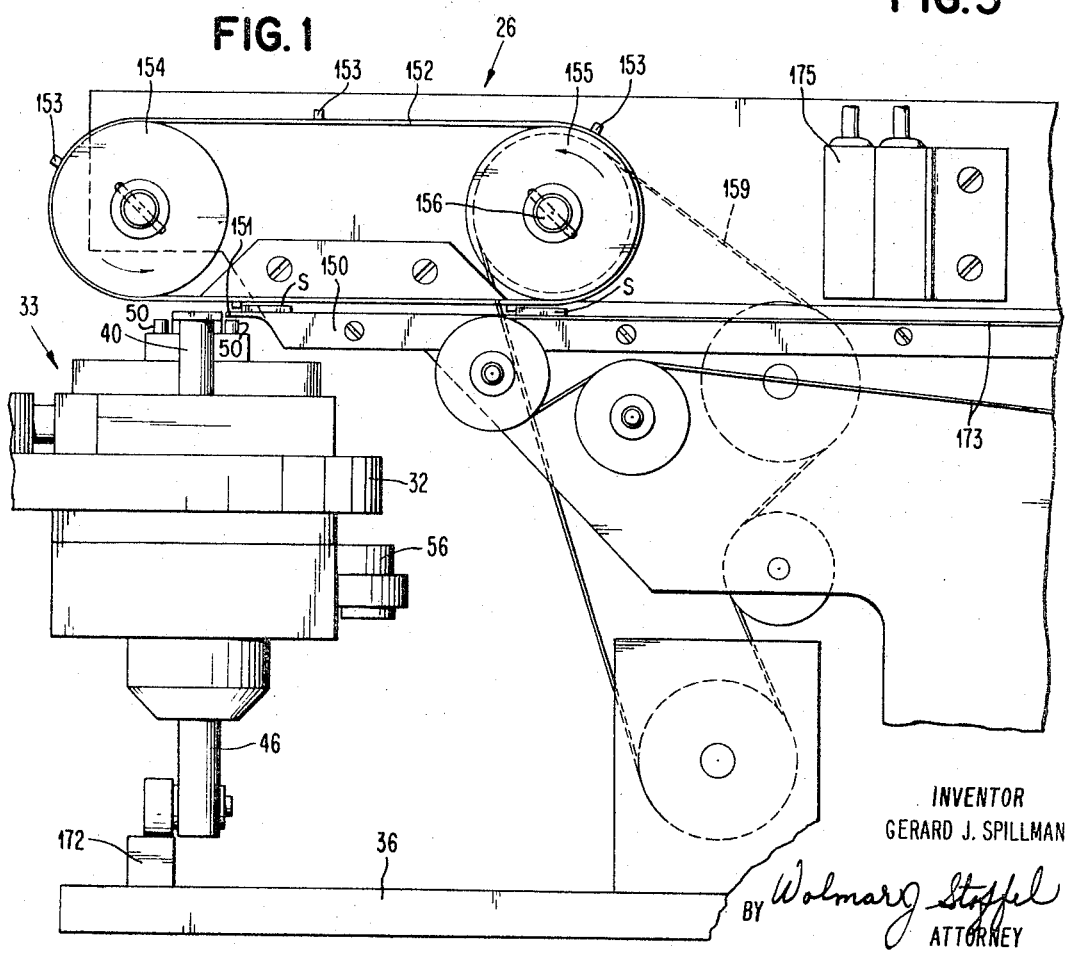
FIG. 1 is a side elevational view illustrating a preferred specific embodiment of the unloader mechanism of the invention.

Unloader 26 has a slide or chute 150 having a terminating end 151 positioned adjacent workpiece holder 33, when located at the unloading station. The height of the terminal end 151 is the same as the height of the pedestal 40 of the workpiece holder 33 when the pedestal is in fully extended up position. A conveyor having a belt 152 with cogs 153 is disposed over the chute 150 and extends over the workpiece holder 33. Belt 152 is supported on pulleys 154 and 155 as indicated in FIG. 1. The belt 152 is driven by pulley 155 in turn connected to driving shaft 156 which is connected through a clutch 157 to the drive mechanism of the printing apparatus. In the clutch 157, driving torque is applied to pulley 158 by belt 159, in turn connected to the driving mechanism of the printing apparatus. Pulley 158 has a flange 158a having disposed therein ball receiving indentations 160. A hub 161 is keyed to shaft 156 and has a flange 162 disposed adjacent the flange 158a. Spring biased balls 163 are seated in apertures in flange 162 as indicated in FIG. 3. Located adjacent hub 161 is a second hub 165 that is spring biased into engagement with hub 161 by spring 166. Hub 165 has a flange 167 positioned adjacent the microswitch 168. Pins 170 are disposed between the balls 163 and flange 167 of hub 165.

In normal operation torque is transmitted from pulleys 158 to hub 161 which is keyed to the driving shaft 156 of pulley 155. However, if a malfunction occurs wherein the torque is sufficient to displace balls 163 from the depressions 160 in flange 159, pins 170 force hub 165 longitudinally which actuates microswitch 168. Activation of microswitch 168 shuts down the driving mechanism of carrier 32.

In operation carrier 32 moves the workpiece holder 33 into the unloading station. At the unloading station the pedestal elevator 172 is moved upwardly, spring biasing pedestal 40 upwardly. Simultaneously, cam actuator arm 59 engages the cam follower arm 56 and opens the clamping arms 50 of workpiece holder 33. Subsequently, the substrate held on pedestal 40 is elevated to the same elevation as the terminal end 51 of chute 150. The timing of the conveyor belt 152 is such that a cog 153 immediately sweeps the substrate S from the pedestal 40 onto the chute 150. A conveyor 173 then moves the unloaded substrate off to storage or other processing equipment. Vacuum is applied to the pedestal 40 through a longitudinally extending passage to hold the substrate thereon prior to moving the carrier to the unload station. A rotary valve (not shown) is disposed about the axis of carrier 32 to control the suction applied to pedestal 40. Photocell 175 can be provided to detect a backup of substrates on conveyor 173. In the event that there is a back-up, the driving mechanism of carrier 32 will be interrupted thereby preventing damage to the conveyor and to substrates positioned on the conveyor.

While the invention has been particularly shown and described with reference to a preferred specific embodiment thereof, it will be understood by those skilled in the art that various changes in form and detail may be made therein without departing from the spirit and scope of the invention.

I claim:

1. An article handling mechanism for removing workpieces from a movable carrier at an unload station comprising, workpiece holders on said movable carrier, each of said holders including workpiece clamping means, and a vertically movable pedestal, cam means for opening said clamp means at the unload station, means for moving said pedestal and supported workpiece above said clamping means, a chute at the unload station having a workpiece receiving end positioned adjacent said workpiece holder and at the height of the pedestal in the raised position, a conveyor positioned over said chute in close spaced relationship, said conveyor having at least two spaced pulleys, an endless flexible band disposed over said pulleys, having a span supported over said chute in close parallel relationship, a plurality of cogs on said band adapted in use to sweep a workpiece from the pedestal of said workpiece holder, when said pedestal is in the raised position, onto said chute, and a means to drive said conveyor in synchronism with said movable conveyor.

2. The article handling mechanism of claim 1 wherein said pedestal includes a passage communicating with a source of vacuum, and which opens to the workpiece support surface.

3. The article handling mechanism of claim 1 wherein said movable carrier is an indexable rotary carrier.

4. The article handling mechanism of claim 1 wherein said means to drive said conveyor includes a safety means to interrupt the unloading operation comprised of a slip-type clutch to interrupt the driving relation of said belt, and a switch means to halt movement of said rotary carrier in response to slippage of said clutch.

5. The article handling mechanism of claim 4 wherein said clutch is comprised of a first flange in operative driving relation with one of said pulleys and having at least one indentation on the radial face thereof, a driving second flange axially aligned with said first flange, a spring biased protuberance on said second flange adapted to selectively engage said indentation on said first flange.

6. The article handling mechanism of claim 5 wherein said safety means is comprised of, a third flange rotatable with said second flange, means transmitting axial movement of said protuberance caused by displacement from said indentation on said first flange to said third flange, a switch having an actuatable element responsive to axial movement of said third flange.

References Cited

UNITED STATES PATENTS

| 1,520,000 | 12/1924 | Baker | 198—232 |
| 1,583,889 | 5/1926 | Lariviere | 192—150 X |
| 3,135,373 | 6/1964 | Scarf | 198—103 X |
| 3,225,889 | 12/1965 | West | 198—20 |
| 3,282,387 | 11/1966 | Becker | 192—150 |

FOREIGN PATENTS

| 585,778 | 2/1947 | Great Britain. |

EVON C. BLUNK, *Primary Examiner.*

EDWARD A. SROKA, *Examiner.*